United States Patent
Beasley et al.

[11] Patent Number: 5,924,049
[45] Date of Patent: Jul. 13, 1999

[54] METHODS FOR ACQUIRING AND PROCESSING SEISMIC DATA

[75] Inventors: Craig J. Beasley; Ronald E. Chambers, both of Houston, Tex.

[73] Assignee: Western Atlas International, Inc.

[21] Appl. No.: 09/016,679

[22] Filed: Jan. 30, 1998

Related U.S. Application Data

[63] Continuation-in-part of application No. 08/829,485, Mar. 28, 1997, Pat. No. 5,717,655, which is a continuation of application No. 08/423,781, Apr. 18, 1995, abandoned.

[51] Int. Cl.$^6$ ..................................................... G06F 19/00
[52] U.S. Cl. .................................................. 702/17; 367/56
[58] Field of Search ................................. 702/17, 16, 14; 367/23, 53, 56, 57, 50

[56] References Cited

U.S. PATENT DOCUMENTS

| | | | |
|---|---|---|---|
| 2,897,476 | 10/1959 | Widess | 702/17 |
| 3,290,644 | 12/1966 | Hoskins | 367/21 |
| 3,496,532 | 2/1970 | Thigpen . | |
| 3,602,878 | 8/1971 | Sullivan | 340/7 R |
| 3,687,218 | 8/1972 | Ritter | 181/107 |
| 3,985,199 | 10/1976 | Baird | 181/107 |
| 4,042,906 | 8/1977 | Ezell | 340/15.5 TS |
| 4,159,463 | 6/1979 | Silverman | 367/59 |
| 4,224,474 | 9/1980 | Savit | 370/68 |
| 4,300,653 | 11/1981 | Cao et al. | 181/107 |
| 4,486,864 | 12/1984 | Ongkiehong et al. | 367/23 |
| 4,797,861 | 1/1989 | Beasley | 367/50 |
| 4,823,326 | 4/1989 | Ward | 702/14 |
| 4,914,636 | 4/1990 | Garrotta et al. | 367/56 |
| 4,930,110 | 5/1990 | Bremner et al. | 367/56 |
| 4,953,657 | 9/1990 | Edington | 181/111 |
| 4,970,696 | 11/1990 | Crews et al. | 367/56 |
| 4,982,374 | 1/1991 | Edington et al. | 367/48 |
| 5,430,689 | 7/1995 | Rigsby et al. | 367/56 |
| 5,450,370 | 9/1995 | Beasley et al. | 367/53 |
| 5,677,892 | 10/1997 | Gulunay et al. | 367/38 |
| 5,717,655 | 2/1998 | Beasley | 367/53 |

OTHER PUBLICATIONS

Beasley, Craig J., Quality Assurance of Spatial Sampling for DMO, 63rd Annual Meeting of Society of Exploration Geophysicists, published in Expanded Abstrats, pp. 544–547, 1993.

Vermeer, Gijs J.O., Seismic Acquisition 3:3–D, Data Acquisition, 64th Annual Meeting of the Society of Exploration Geophysicists, published in Expanded Abstracts, pp. 906–909, 1994.

Egan, Mark S.; Dingwall, Ken; and Kapoor, Jerry; Shooting direction: A 3–D marine survey design issue, The Leading Edge, Nov. 1991, pp. 37–41.

*Primary Examiner*—Donald E. McElheny, Jr.
*Attorney, Agent, or Firm*—E. Eugene Thigpen

[57] ABSTRACT

A method for acquiring and processing seismic survey data from two or more seismic sources activated simultaneously or nearly simultaneously or for a single source moved to and fired at different locations. In one aspect such a method includes acquiring seismic survey trace data generated by the source or sources, attaching source geometry to the traces, soring the traces according to a common feature thereof, (e.g. to CMP order), interpolating data points for discontinuities on the traces, selecting two halves or two portions slightly more than half of the traces, filtering the trace data for each of the two portions to filter out data related to a second one of the two seismic sources, reducing the filtered trace data to two halves of the data and deleting interpolated data, and then merging the two halves to produce refined useful seismic data related to a first one of the seismic sources. In one aspect the method includes re-processing the data and filtering out the trace data for the second seismic source to produce refined useful seismic data related to the second seismic source. In one aspect the sources are fired temporally close together and, in one particular aspect, they are fired substantially simultaneously.

42 Claims, 8 Drawing Sheets

Fig. 19

METHODS FOR ACQUIRING AND PROCESSING SEISMIC DATA

RELATED APPLICATION

This is a continuation-in-part of U.S. application Ser. No. 08/829,485 filed Mar. 28, 1997, now U.S. Pat. No. 5,717,655 which is a continuation of U.S. application Ser. No. 08/423, 781 filed Apr. 18, 1995, now abandoned, and was co-pending therewith. U.S. application Ser. No. 08/829,486 and U.S. application Ser. No. 08/423,781 are both entitled "A METHOD FOR PROVIDING UNIFORM SUBSURFACE COVERAGE IN THE PRESENCE OF STEEP DIPS", and both are co-owned with the present invention and incorporated fully herein for all purposes.

BACKGROUND OF THE INVENTION

1. Field of the Invention

The present invention, in certain aspects, is directed to seismic survey systems and methods in which two or more seismic sources are fired simultaneously, or significantly close together temporally, but which is, in one aspect, significantly spatially separated, and resulting seismic data is processed meaningfully utilizing data generated by both (or more) seismic sources.

3-D marine seismic surveys entail towing a swath of elongated seismic sensor arrays. Subsea formations are acoustically illuminated to produce seismic reflection data that are detected and processed by the arrays and associated ancillary equipment. In the presence of steeply-dipping subsea formation, this invention corrects the non-uniform illumination of the formations due to the backward geometry caused by the steeply-dipping wavefield trajectories.

2. Description of Related Art

The prior art discloses seismic survey systems and methods employing two or more seismic sources firing simultaneously. In order to make meaningful use of resultant seismic data, each source is initially encoded differently [e.g. signals at different frequency bands or phases (orthogonal)] so that resulting seismic data contains a signature indicating to which source the data is related. Such encoding requires corresponding decoding when processing the data. Often, in actual practice, the level of separation achievable is not satisfactory. Also, encoding is impractical for some source configurations.

There has long been a need, now recognized and addressed by the present invention, for seismic survey methods in which multiple seismic sources firing simultaneously or temporally close together may be used effectively and efficiently. There has long been a need for such methods which do not require individual encoding or other separate identification of each of two or more seismic sources.

In 3-D marine operations, a seismic ship tows a swath including a plurality of parallel seismic streamer cables along a desired line of survey, the cables being submerged by a few meters beneath the water surface. The number of cables that make up a swath depends only on the mechanical and operational capabilities of the towing ship. There may be six or more such cables, spaced about 50 to 100 meters apart. The respective cables may be up to 3000 meters long.

Each streamer cable typically includes about 120 spaced-apart seismic detector groups. Each group consists of one or more individual interconnected detectors, each of which services a single data channel. The group spacing is on the order of 25 to 50 meters longitudinally along the cable. The seismic detectors are transducers that perceive the mechanical activity due to reflected acoustic wavefields and convert that activity to electrical signals having characteristics representative of the intensity, timing and polarity of the acoustic activity as is well known to the art. The detectors are operatively coupled to data-storage and processing devices of any desired type.

An acoustic source such as an array of air guns, is towed in the water by the ship near the leading end of the swath of seismic streamer cables. As the ship proceeds along the line of survey, the source is fired (activated) at selected spatial intervals equal, for example, to a multiple of the seismic detector group spacing, to acoustically illuminate (insonify) the subsurface formations. Assuming the ship travels at a constant velocity such as six knots, the source may be conveniently fired at selected time intervals such as every five seconds, assuming a 50-meter group interval. The wavefield emitted by the source travels downwardly to be reflected from subsea earth formations, whence the wavefield is reflected back to the water surface where the reflected wavefield is received by the detectors and converted to electrical signals as previously explained. The detected electrical signals are transmitted to any well-known signal recording and processing means for providing a physical model of the subsurface.

Figure 1:
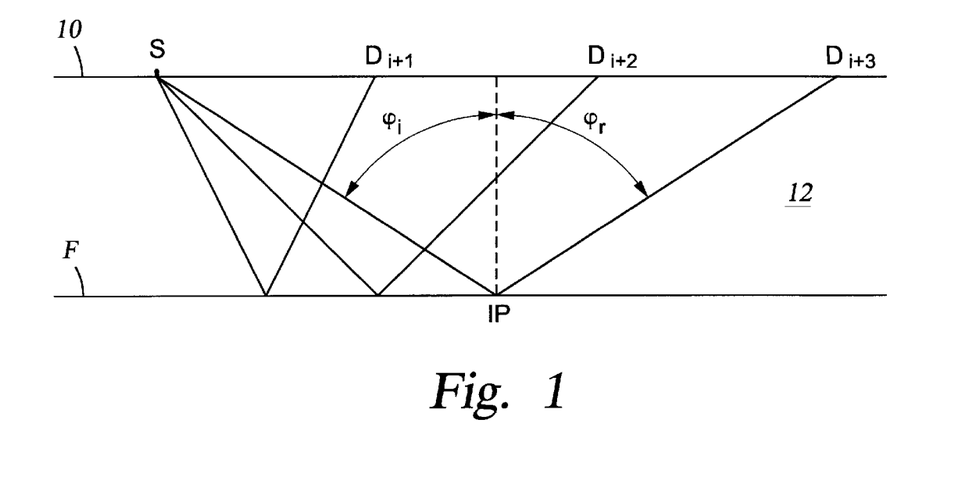
FIG. 1 shows acoustic raypaths in the presence of zero dip.

For a better understanding of a problem to be solved by this disclosure, FIG. 1 shows a source, S, at or near the surface 10 of the water 12. Detectors $D_{i+1}$, $D_{i+2}$, $D_{i+3}$ are disposed near the water surface above a flat-lying formation F. A wavefield emitted from S follows the indicated ray paths to the respective detectors as shown. For example, the ray path from S to $D_{i+3}$ is reflected from incident point IP on formation F. The incident angle $\phi_i$, relative to the perpendicular to F at IP or zero-offset point Z, must equal the angle of reflection $\phi_r$ as in geometric optics, assuming the earth material is isotropic. The surface expression of the subsurface reflection point, R, the midpoint between S and $D_{i+3}$, M, and the zero offset point, Z, are coincident. The incident points of all of the raypaths are evenly distributed along the line as shown.

Figure 2:
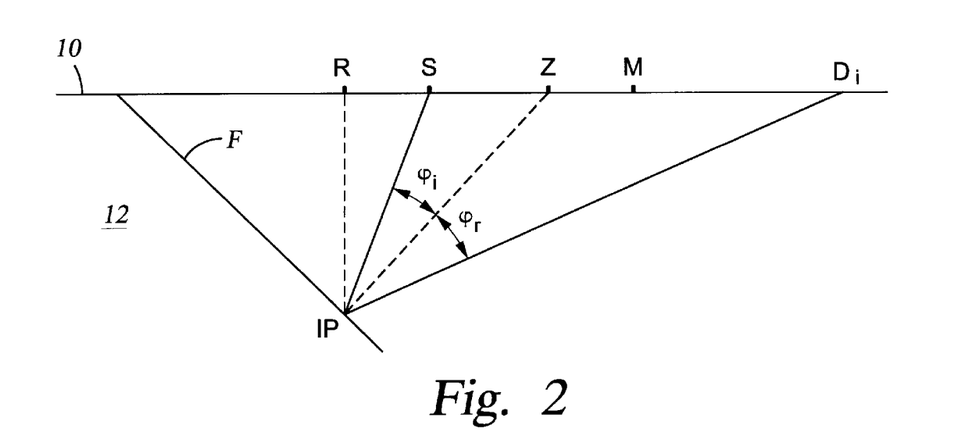
FIG. 2 provides definitions for certain data-processing terms.

In regions of steep dip, the symmetrical picture of FIG. 1 is distorted as shown in the 2-D illustration of FIG. 2. are, with a dip of 45°, while the angles of incidence and reflection $\phi_i$ and $\phi_r$ are equal, the zero-offset point Z, is up-dip of the midpoint M. The surface expression R, of the reflection point (incident point IP) lies not between the source and detector as in FIG. 1, but up-dip of the source S.

Figure 3:
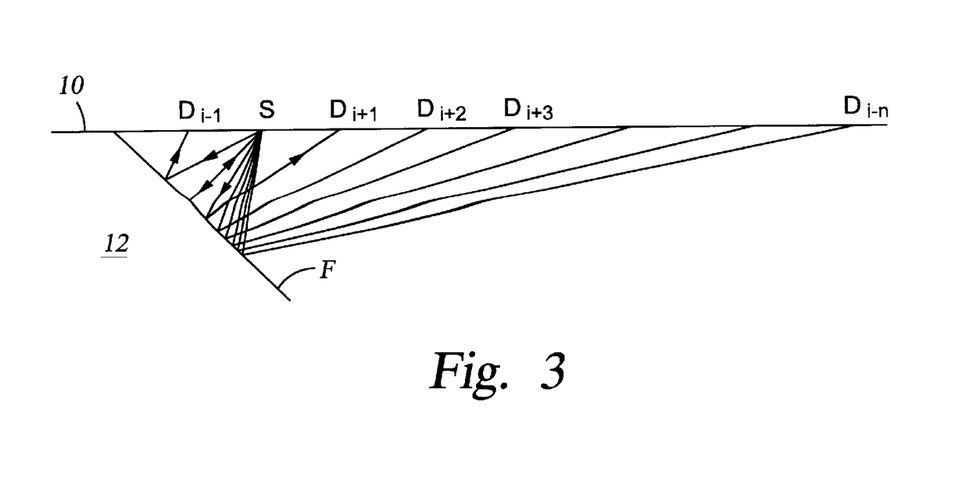
FIG. 3 demonstrates the non-uniform insonification of the subsurface in the presence of steep dips.

FIG. 3 traces a number of raypaths from a source S to detectors $D_{i-1}$, $D_{i+1}$, $D_{i+2}$, $D_{i+3}$, $D_{i+n}$ for a 45°-dipping bed F. The important point to observe in this Figure is the non-uniform spacing of the incident points. Because reciprocity holds, assuming that the earth materials are isotropic, the source and detectors can be interchanged. It is thus evident that when shooting down-dip, the incident points tend to bunch up. Shooting up-dip results in a spreading-apart of the incident points. Because of the complex non-uniform subsurface illumination, significant undesirable shadow zones are formed. The problem becomes particularly troublesome where multiple cables are used in a 3-D swath, due to the additional awkward lateral geometry.

One method for minimizing shadow zones is taught by C. Beasley (co-inventor in the present invention) in U.S. patent application Ser. No. 08/069,565 filed May 28, 1993, entitled, "Quality Assurance for Spatial Sampling for DMO", assigned to the assignee of this invention and issued Sep. 12, 1995 as U.S. Pat. No. 5,450,370 which is incorporated fully herein for all purposes. That application is the basis for a paper delivered in 1993 at the 63rd Annual meeting of the Society of Exploration Geophysicists and published in Expanded Abstracts, pp. 544–547. That invention provided a method for examining the geometry of the disposition of a plurality of sources and receivers over an area to be surveyed with a view to optimizing the array to avoid shadow zones in the data and to optimize the resulting seismic image. The method depends upon studying the statistical distribution of dip polarity in dip bins along selected CMP azimuths. The method was implemented by rearranging the geometrical disposition of the sources and receivers. It was not directed to the per se problem of non-uniform subsurface coverage and shadow zones in the presence of steep dips.

Another discussion directed to symmetric sampling is found in a paper entitled, "3-D Symmetric Sampling" by G. Vermeer, and delivered in 1994 in a paper at the 64th Annual Meeting of the Society of Exploration Geophysicists, Expanded Abstracts, pp 906–909. Here, the authors review the various different shooting geometries involved in land and marine surveys including 2-D, 3-D and 5-D configurations. The presence of non-uniform subsurface insonification is recognized and the need for symmetric sampling to prevent aliasing is emphasized.

M. S. Egan et al., in a paper entitled, "Shooting Direction: a 3-D Marine Survey Design Issue", published in *The Leading Edge*, November, 1991, pp 37–41 insists that it is important to maintain consistent source-to-receiver trajectory azimuths to minimize shadow zones, imaging artifacts and aliasing in regions of steep dips. They are particularly concerned about 3-D marine surveys in areas where the proposed seismic lines are obstructed by shipping, offshore structures and other cultural obstacles.

There is a need for equalizing the density of the subsurface coverage provided by wide, towed swaths of seismic streamer arrays in the presence of steeply-dipping earth formations in the circumstance where the acoustic source is located at an end of the swath.

SUMMARY OF THE INVENTION

This method may be applied to any form of seismic operation, be it on land or on sea. However for convenience, by way of example but not by way of limitation, certain disclosures are explained in terms of a marine seismic survey.

The present invention, in certain aspects, discloses a seismic survey system for use at sea or on land with two, three, four, or more seismic sources (or one source moved form one location to another and fired at multiple locations) for generating an acoustic wavefield (e.g., but not limited to, acoustic sources, e.g. air guns); a plurality of spaced-apart seismic detectors for discrete sampling of the acoustic wavefield reflected and/or refracted from earth layers (e.g., but not limited to geophones or hydrophones); and, at sea, a vessel or vessels for carrying or towing the seismic sources and, in one aspect, the detectors. In one aspect, the seismic sources are activated simultaneously at a known location with the seismic sensors at a known location. In another aspect, the seismic sensors are activated over a relatively short time period, e.g., but not limited to, within 25 seconds and preferably within 15 seconds. In one aspect, the seismic sources' signals are "plain," e.g. they bear no encoding or individual identifying signature. In another aspect, methods according to the invention are used with encoded signals.

Resultant seismic wavefields (e.g. resulting from reflection and/or refraction from sub-surface strata) are sensed as seismic data and transmitted from the seismic sensors to known apparatus for receiving, storing, transmitting, and/or processing such data (signals). In one aspect, each seismic sensor senses, from an earth layer, a part of a resulting acoustic wavefield generated by each seismic source.

The resulting seismic data contains reflections, refractions, etc., due to each source and is processed to separately distinguish data related to each source. For example, in one method according to the present invention, seismic data from a marine streamer geometry with two sources firing simultaneously off of both ends of a single streamer cable is recorded onto a single shot record. The shot record contains information from both sources and the record is processed twice. With two passes through the process the information from each particular source is separated from the signal from the other source. To separate the sources' data, the record is updated with one source's geometry information (e.g. x, y location coordinates and time of day identifiers, e.g. SEG standard format information, are attached to the seismic data traces by known methods, e.g. a header with the desired information is applied to a trace tape); optionally sorted to order, e.g. by known common mid-point (CMP) sorting methods or known methods such as common shot order, common detector order or common offset order and/or combinations thereof; optionally trace interpolated to theoretically produce a well-sampled curve between known data points by known methods, and spatially paneled, i.e., a portion of the data is isolated that includes data from both sources. Each panel of data is then dip filtered by known methods to remove the effects of the signal from the other source. The panels are then merged together producing the seismic data related to only one of the seismic sources. The interpolated traces are removed if created. The process is then re-done with the attachment of the other source's geometry producing the seismic data related to the other seismic source. After the two passes, there will be twice as many shot records than before the process; e.g. for two sources and one initial shot record, two data records are produced; or, in other aspects, multiple shots, e.g. three, four, five, etc. or more.

In an aspect of this invention, there is provided a method for providing a more uniform insonification of subsurface earth formations for the purpose of minimizing shadow zones. To that end, a swath of parallel, elongated seismic cables, each including a plurality of spaced-apart seismic detectors, are advanced along a line of survey. A first acoustic source is positioned near the leading end of the swath and a second acoustic source is located near the trailing end of the swath. At alternate timed intervals, substantially simultaneously, or within at least 25 seconds of each other and, in one aspect, within at least 15 seconds of each other, the sources launch a wavefield that is reflected from the subsurface earth formations to provide first and second seismic-signal data sets. Means, operatively coupled to the detectors, process and merge the first and second data sets to provide a uniformly-insonified model of the subsurface earth formations substantially free of shadow zones.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE EMBODIMENTS PREFERRED AT THE TIME OF FILING FOR THIS PATENT

Figure 4:
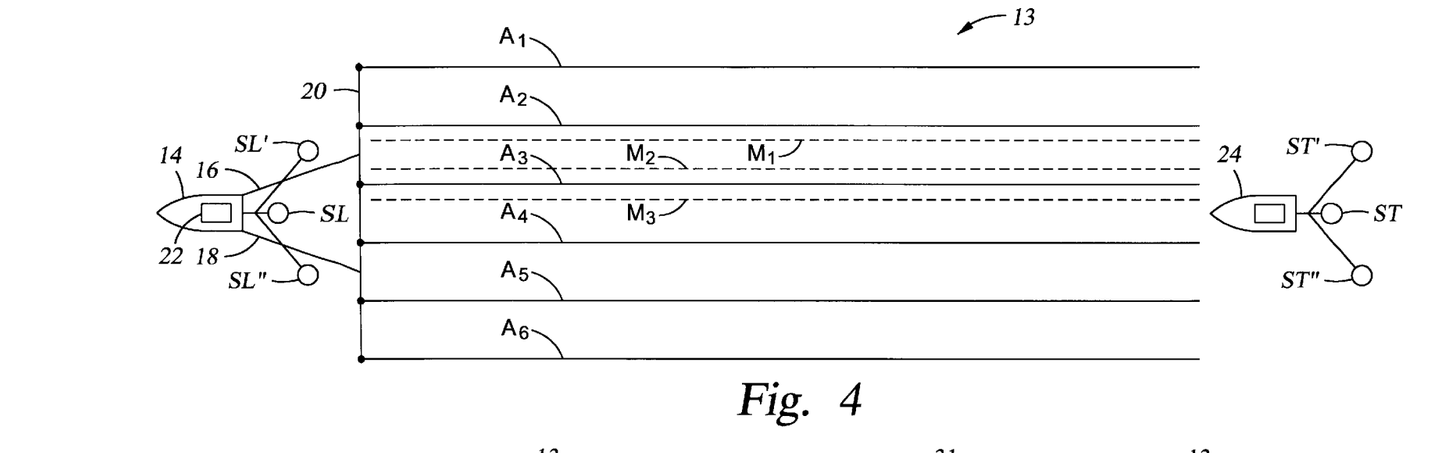
FIG. 4 is a plan view of the configuration of a typical swath of cables and associated acoustic sources such as may be used in 3-D marine seismic surveying.

Please refer now to FIGS. 3 and 4. FIG. 4 is a plan view of a 3-D swath 13 of six parallel seismic cable arrays A1–A6 which are being towed through a body of water by a ship 14. (It should be understood that, if land operations are under consideration, the cables could, according to the present invention, be towed by one or more trucks or could be laid out by cable trucks using roll-along techniques in a manner well-known to the seismic industry.) Signals from the respective cable arrays A1–A6 are fed over a data-signal manifold 20 to a processing means 22 of any well-known type, installed on ship 14 and operatively coupled to means 22 by electrical lead-ins 16 and 18. A discrete acoustic source SL is towed by ship 14 near the leading end of swath 13, substantially at the center of the swath. More than one discrete source such as SL' and SL", offset from the center line may be used if desired.

Dashed line $M_3$ is a line of midpoints that might be associated with seismic cable A3 positioned towards the center of the swath such as suggested by FIG. 3 for a 2-D slice of the earth where it was shown that the subsurface reflection points tend to converge when shooting down-dip. In the case of a 3-D operation, employing the swath of FIG. 4, the laterally-distributed, crossline lines of midpoints corresponding to detector cables A2 and A1 are shown as dashed lines $M_2$ and $M_1$. Similar lines (not shown) may be drawn for cables A4–A6.

Figure 5:
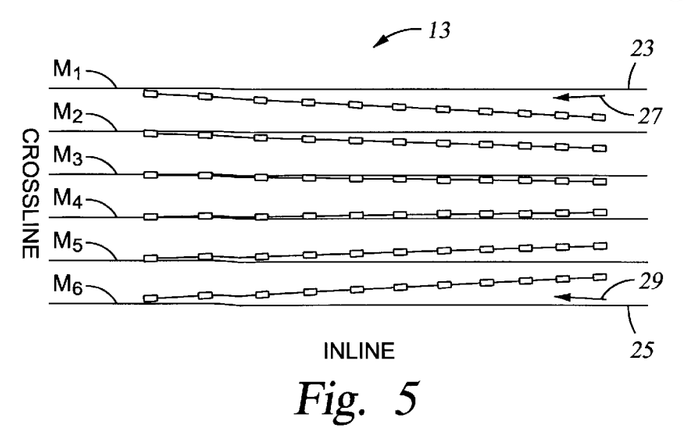
FIG. 5 shows the surface expression of subsurface reflection points and the shadow zones associated with steep dips with respect to a swath where the source is positioned near the leading end of the swath.

FIG. 5 shows, as small rectangles, the surface expression of steeply-dipping subsurface reflection points for every 12th detector of a 120-detector swath of six cables represented as straight, evenly-spaced, horizontal lines A1–A6. With the cables spaced 100 meters apart, the solid lines represent the lines of midpoints for the respective cables and are 50 meters apart, each cable being 3000 meters long. The source SL is at the leading or left hand end of the swath; up-dip and direction of advance of the ship are to the left. As would be expected from FIG. 3, the reflection points tend to converge down-dip along the inline direction. Crossline, the subsurface reflection points do not stray far from the inner central-cable midpoint lines M3 and M4. But the subsurface reflection points for the outer midpoint lines M1, M2, M5 and M6, corresponding to cable A1, A2, A5 and A6 converge towards the center line of the swath 13 by 25 to 30 meters, creating down-dip crossline shadow zones marked by the arrows 27 and 29 at the right hand end of the swath 13.

Under conventional practice, to fill in the shadow zones, the operator would be obliged to resurvey the region by making a second pass over the region. That process is decidedly uneconomical.

Figure 6:
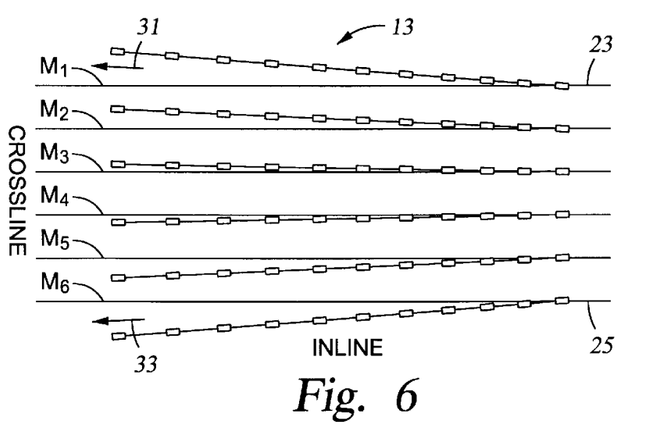
FIG. 6 shows the surface expression of subsurface reflection points and the shadow zones associated with steep dips with respect to a swath wherein the source is located near the trailing end of the swath.

Please refer now to FIGS. 4 and 6. A second ship 24, towing an acoustic source ST launches a wavefield from the trailing end of swath 13. Here, also, more than one discrete source such as ST' and ST" may be used. FIG. 6 shows the subsurface reflecting points (small rectangles as for FIG. 5) associated with every 12th detector for swath 13 when source ST is actuated. As before, the straight horizontal lines M1–M6 represent the midpoint lines that make up swath 13. Here again, the subsurface reflection points for the two middle lines M3 and M4 are nearly coincident with the midpoint lines although significant up-dip in-line and crossline divergence is present. Crossline, the subsurface reflection points diverge well outside the lateral limits of the swath as demarcated by lines 23 and 25, leaving a non-uniformly insonified up-dip zone as indicated by arrows 31 and 33.

Comparison of FIGS. 5 and 6 show that the crossline subsurface coverage provided by the innermost cables A3 and A4 does not depart very much from the line of midpoints regardless of the source location with respect to the leading or trailing end of the swath. But FIGS. 5 and 6 suggest that by insonifying the swath from both ends in alternate cycles, the gaps due to non-uniform insonification at the outer crossline swath limits, created by single-ended source activation, can be virtually eliminated when the resulting data are properly processed and merged. By this teaching, a model of the subsurface earth formations results, with the shadow zones filled in completely, as may be seen readily by superimposing (merging) FIG. 5 over FIG. 6. The proposed method is therefore an economic alternative to a resurvey operation that was previously required.

Figure 13:
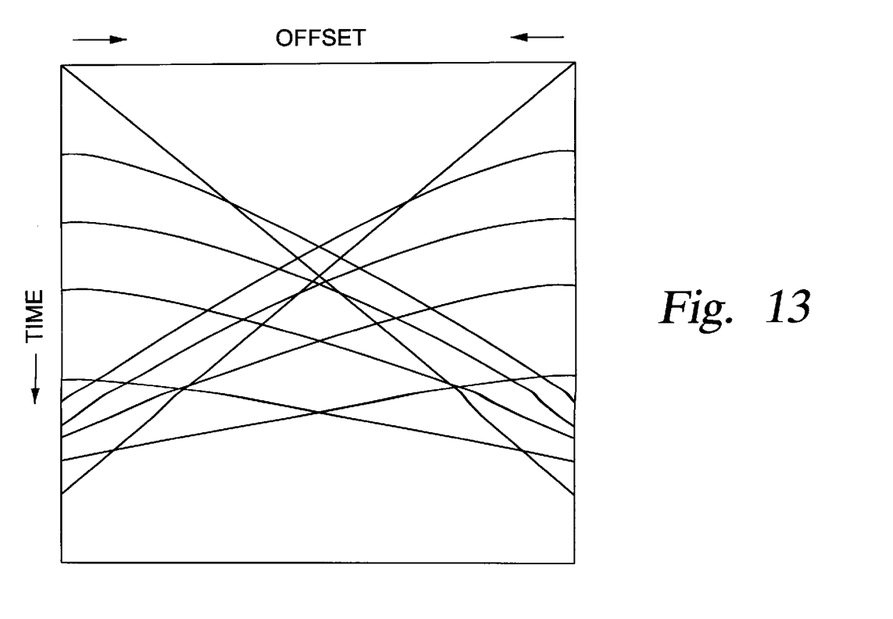
FIG. 13 is a graphical representation of a marine streamer shot record produced with two seismic sources by methods according to the present invention. For a source to the right, the offset distance increases from right to left in this figure.

It might be suggested that a single acoustic source could be positioned at the geometric center of swath 13 such that a single activation of a source would produce both an up-dip and a down-dip component such as provided by a conventional split-spread. That process is useful with single cables or widely-spaced dual cables. But for large-scale 3-D swaths or patches that use many closely-spaced cables, that procedure is impractical. The physical configuration of the cables cannot be accurately controlled within the required tolerance in actual operation nor could a ship, which itself may be 20 meters wide, be safely stationed in the middle of the swath without causing cable damage.

In the presently-contemplated best mode of operation, the swath 13 of parallel elongated seismic cables is effectively advanced along a desired line of survey either physically as by towing or by use of well-known roll-along methods. A first acoustic source (or sources), SL is located near the leading end of the swath. A second acoustic source (or sources) ST is positioned near the trailing end of swath 13. The first and second sources are activated at timed intervals in alternate cycles to provide first and second reflected wavefields. The reflected wavefields are detected and converted to first and second data sets of reflected signals. The first and second data sets of electrical signals are processed and merged as indicated in the flow diagram of FIG. 7, to be described later, to provide uniformly-insonified subsurface reflection points along the line of survey. Preferably, the swath is advanced along the line of survey at a constant velocity. The lengths of the first and second timed intervals are substantially constant and designed to allow the swath to advance spatially, at the selected velocity of advance, by some desired multiple of the spacing between detector groups in the seismic cables.

In the event that several discrete acoustic sources are used at each end of the swath, such as SL, SL', SL" and ST, ST', ST", the sources may be activated in some desired alternating sequence such as SL-ST, SL'-ST', SL"-ST", etc., thereby to provide denser subsurface coverage using the same swath of cables.

Thus far, it has been contemplated that the sources are activated sequentially and the reflected wavefields are recorded in a similar sequence. If desired, the leading and trailing sources may be arranged to emit encoded wavefields using any desired type of coding. The respective sources are then programmed to be activated concurrently instead of sequentially. The combined reflected wavefields as recorded are then decoded prior to processing. The advantage to that technique is that the subsurface incident points have improved commonality since there is no time shift and therefore no spatial reflection-point smearing between successive leading and trailing source activations.

Figure 7:
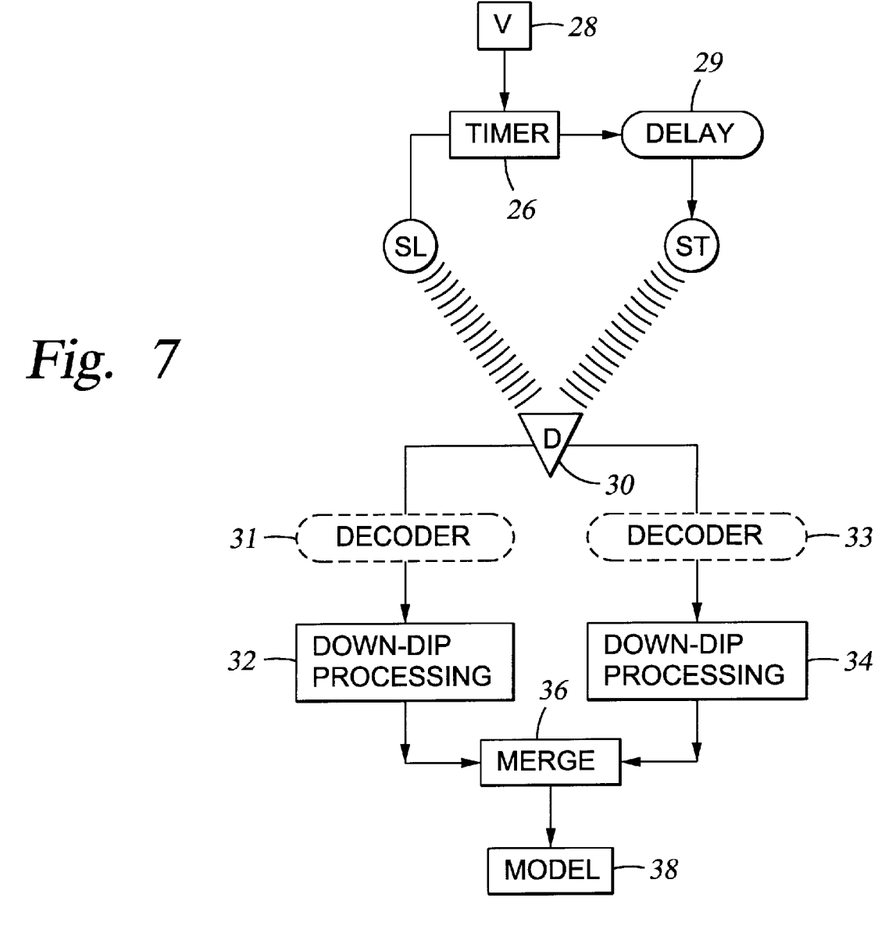
FIG. 7 is a schematic flow diagram of the data processing method.

FIG. 7 is a schematic flow diagram of the data acquisition and processing routine which is implemented by processing means 22 on ship 14. A timer 26 controls the firing rate of sources SL and ST at first and second timed intervals commensurate with the ship's velocity, V, which is input to timer 26 from a velocimeter 28 of any desired type which may be a portion of a satellite navigation system.

Figure 8:
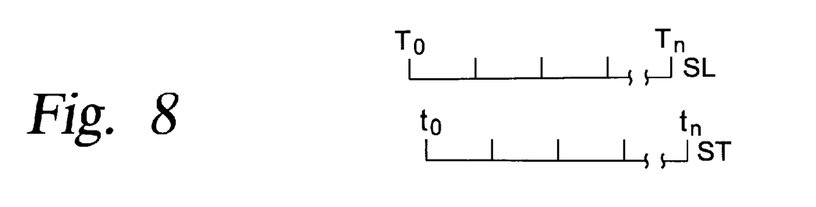
FIG. 8 is a timing diagram for controlling the activation sequence of the acoustic sources.

Timer 26 causes sources SL and ST to launch a first and a second acoustic wavefield in alternate cycles in accordance with the timing diagram shown in FIG. 8. Assuming that source SL is first activated at time $T_0$ and thereafter repeatedly activated at timed intervals until time $T_n$, source ST is activated at time $t_0$ after a time shift through delay line 29 of half an interval and thereafter repeatedly activated until time interval $t_n$. Timer 28 is preferably installed on ship 14 but sends source-activation commands to source ST on ship 24 by any convenient synchronizing means such as by radio.

Item 30 symbolizes the mass of detectors included by seismic cable swath 13 which is insonified in alternate cycles by the sources SL and ST. The electrical data sets that are derived from down-dip insonification are detected, stored as a first recording and then processed in device 32. Similarly, up-dip data sets are detected, stored as a second recording and processed in device 34. Devices 32 and 34 may be portions of a suitably-programmed computer using any of a number of well-known processing routines such as application of NMO, DMO and migration. If the recorded reflected acoustic wavefields were encoded, of course optional decoders 31 and 33 (dashed outlines labeled DEC) would be inserted between the collective-detector symbol 30 and processors 32 and 34.

Following processing, the processed down-dip and up-dip data sets are merged at 36 to provide a filled-in model of the subsurface such as may be produced by a display device 38 of any desired type.

Figure 9:
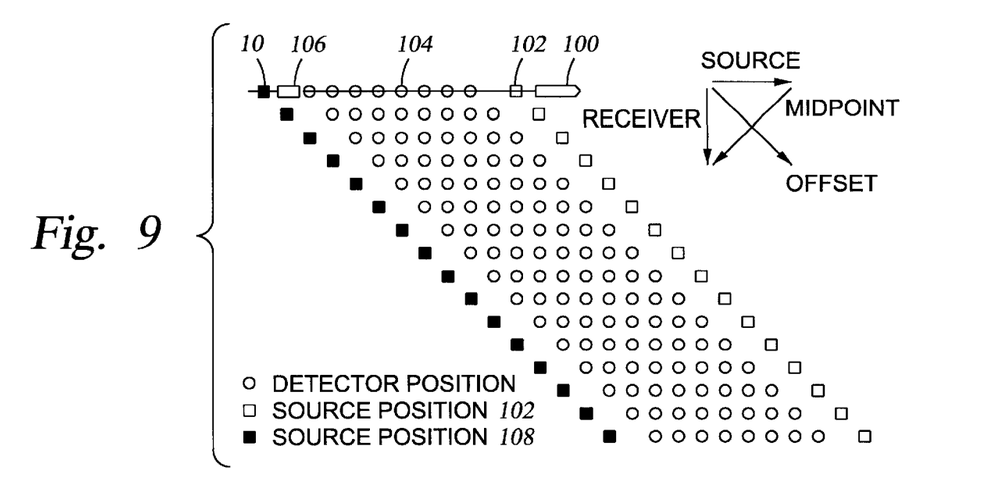
FIG. 9 is a schematic representation of a prior art marine seismic streamer system useful in methods according to the present invention.

FIG. 9 shows schematically an exemplary marine seismic streamer system useful in methods according to the present invention that includes a host vessel 100 towing a first seismic source 102 (e.g., but not limited to, an air gun) and a plurality of seismic detectors 104. A second vessel 106 tows a second seismic source 108. The second vessel 106 may be located at any position apart from and with respect to the host vessel 100. The source/detector/rows beneath the top row of FIG. 9 (that includes the vessels) shows schematically the time progress of the sources and detectors from left to right and each row is to be understood as superimposed on the top row (i.e., there is no movement laterally (or down the page as viewed in FIG. 9). Thus FIG. 9 presents a representation of 16 distinct firings of the seismic sources 102 and 108 (e.g. 10, 25, 50, or 100 meters apart), with the sources fired simultaneously or nearly simultaneously. It is within the scope of this invention for there to be any number of source firings from one to several hundred or more. It is also within the scope of this invention for there to be one, a few, or several detectors or receivers; a plurality of detectors; and/or a plurality of tow lines each with one or more detectors towed by the host vessel and/or the second vessel. Alternatively, one vessel may tow multiple seismic sources or each of two or more vessels may each tow two or more sources. The insert graphic represents the "offset" or source to detector distance relationship, and the "midpoint" line relationship for source/detector pairs and their related seismic data traces with a common midpoint. For a system as in FIG. 9, typically a diagonal line through the array as presented in FIG. 9 will cut through detector locations related to seismic traces having the same midpoint. The vessels, sources, cables, detectors and other components of the system of FIG. 9 (and those of FIGS. 10 and 11) are all well known in the art.

Figure 10:
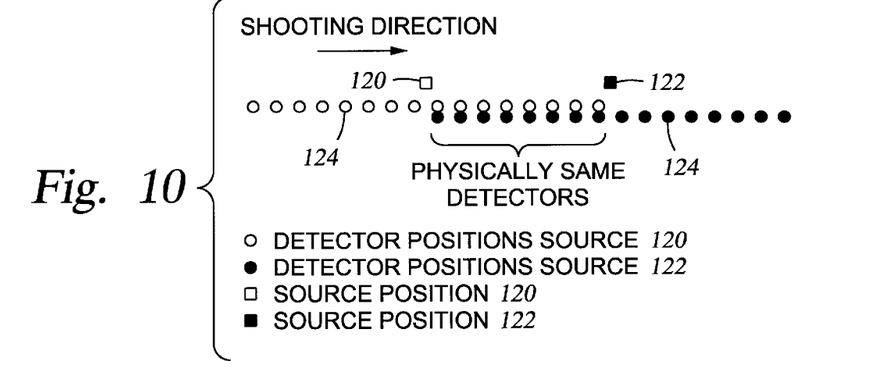
FIG. 10 shows schematically a prior art marine seismic streamer system useful in methods according to the present invention.

FIG. 10 presents a seismic source/detector system useful in land or sea (water) methods according to the present invention which includes a first seismic source 120, a second seismic source 122, and an array of seismic detectors 124. A cable may interconnect the detectors 124. The detectors 124 may be positioned on or in the earth or beneath water, on or in an ocean or lake bed. There may be three or more seismic sources and one, two, three, or more detectors. In methods according to this invention, the two seismic sources 120 and 122 are fired in the position shown simultaneously or nearly simultaneously, generating an acoustic wavefield that reflects from earth layers beneath the detectors 124. There is one line of detectors 124. Those detectors 124 by an open circle sense wavefield generated by the source 120; those indicated by a dark circle sense wavefields generated by the source 122; and those with both types of circles (indicated as "physically same detectors") sense wavefields generated by both sources. Each detector 124 detects a portion of the reflected wavefields and the resulting seismic data is transmitted from the detectors to known receiving, storing, and processing equipment either near the system of FIG. 10 or remote therefrom. Following a first "shot" or firing of the sources 120 and 122, any number of additional shots may be fired from the same and/or from new locations. The source may be a single source moved (e.g. in the "shooting" direction in FIG. 10) from location 120 to location 122. As with each system and method described herein, the location of each source and of each detector for each source firing is known. In one aspect, the seismic sources are moved as indicated by the arrow in FIG. 10 (left to right) but they may, within the scope of this invention, be moved to any desired position.

Figure 11:
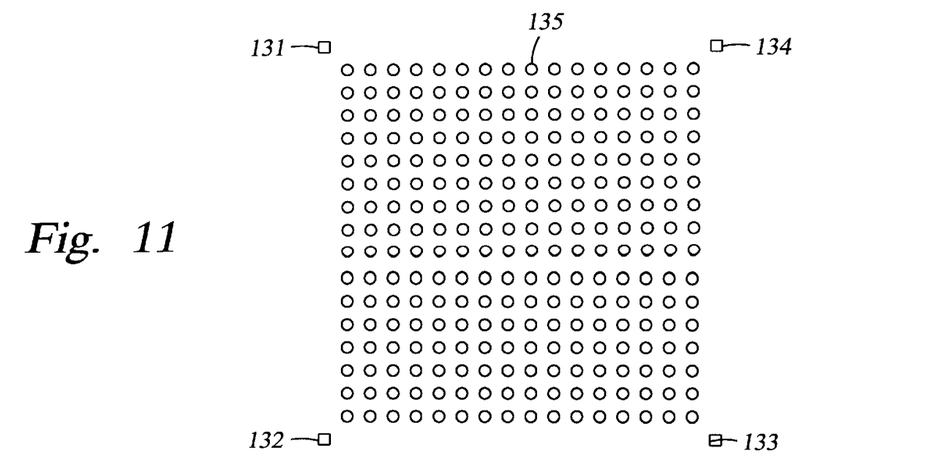
FIG. 11 is a schematic representation of a land-based seismic system used in methods according to the present invention.

FIG. 11 shows schematically a land or water seismic system useful in methods according to the present invention with a plurality of seismic sources 131, 132, 133, and 134 and a "patch" or patterned array of seismic detectors 135. When such a detector array is used in a water environment, it may be placed on or in an ocean or lake bed or it may be towed behind a vessel.

FIGS. 12–17 present graphically seismic data from a system as in FIG. 9 or 10 and processed versions of such data; but it is to be understood that this invention envisions methods (land or water) for multi-source (two or more) systems. The data and processing related to FIGS. 12–17 will be discussed with respect to a marine system.

Figure 12:
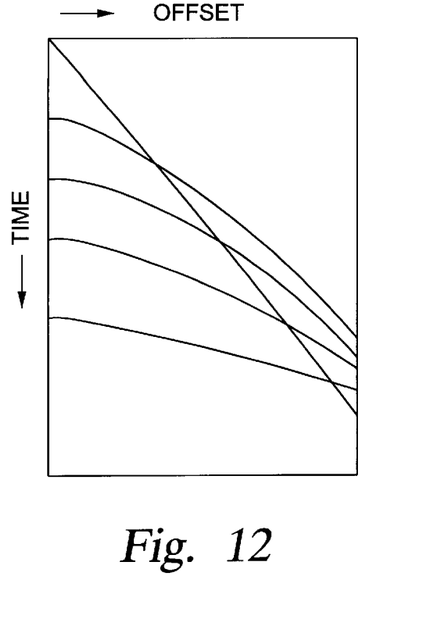
FIG. 12 is a graphical representation of a marine streamer shot record produced with one seismic source by methods according to the present invention. The vertical axis is a time axis with time increasing from top to bottom. The horizontal axis is an "offset" axis (distance from a seismic source to a seismic detector) with distance increasing from left to right. These axes are the same in FIGS. 13–17.

FIG. 12 graphically presents seismic data traces generated by a prior art marine seismic streamer system with a single seismic source and a plurality of detectors. The source is on the left of the Figure. Time increases from top to bottom and offset distance increases from left to right. The straight diagonal line from the top left extending downwardly represents sound going through a cable that interconnects the detectors.

FIG. 13 shows seismic data traces similar to those of FIG. 13, but produced with a two-source system (as discussed above) with sources on both the left and on the right so that offset distance from a left source increases from left to right and offset distance from a second source increases from right to left. Two direct sound lines are generated, one starting at the top left and one starting at the top right. The data traces may represent reflected or refracted signals. A particular offset distance alone (or location coordinates alone) does not relate to a unique event since data defined by this alone may be the result of either of two sources.

In one embodiment, methods according to this invention deal with "plain" acoustic signals or wavefields generated by seismic sources. By "plain" herein and in the appended claims is meant a signal with no encoded feature, individual identifier, tag, discriminating feature, or separate signature (e.g., but not limited to, "plain" including signals at the same frequency without any individuating identifier or signature). Alternatively, the present invention can be used with methods that deal with- seismic data generated by sources producing signals that can be discriminated from each other due to some identifying characteristic, parameter, signature, or feature and, in one aspect, such signals (e.g. in the form of data traces) are processed to isolate signals from various sources and then the data is processed as described below.

Figure 14:
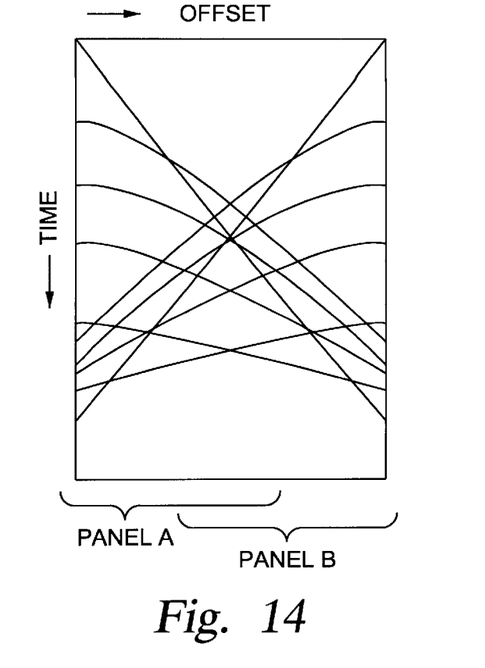
FIG. 14 is a graphical representation of data as in FIG. 13 showing the selection of two overlapping data sets, Panel A and Panel B, the data sets based on offset increasing from left to right (for the left source only).

FIG. 14 illustrates a portion of the trace data from FIG. 13 by sorting the data according to shared common mid-points by known "CMP" sorting methods and then selecting two sets of data traces from the sorted data, the sets designated as "Panel A" and Panel B." In one aspect, as shown in FIG. 14, these sets overlap. According to certain preferred embodiments of this invention, there is a 2%, 5%, 10%, 20%, 25%, 33⅓% or more of an overlap. Alternatively, no overlap is employed. The data trace set of Panel A includes data related to data generated by seismic sources at the back end and at the front end of a seismic system (e.g. sources 108, FIG. 9). The data trace set of Panel B also includes data related to data generated by both seismic sources. One aim of this invention is to provide methods that separate data unique to each source.

Figure 15:
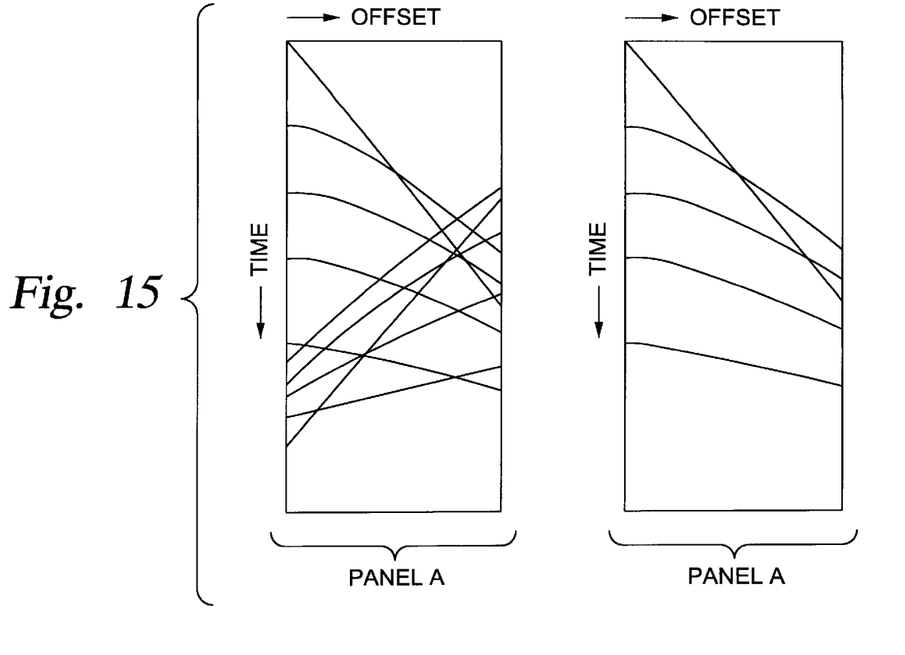
FIG. 15 is a graphical representation of filtering of the data of Panel A (of FIG. 14) to reject events (data) resulting from one of two seismic sources.

FIGS. 15A and 15B illustrate further processing of the Panel A data. By known filtering methods, (e.g. known multi-channel filtering methods such as f–k filtering or Radon transform filtering and wave equation processing such a DMO migration, multiple attenuation, etc.) data traces resulting from data generated by the rear source (source to the right, e.g. source 102, FIG. 9) is filtered out, producing a new Panel A of data as in FIG. 15B which does not include data related to the seismic survey events resulting from the firing of the front source.

Figure 16:
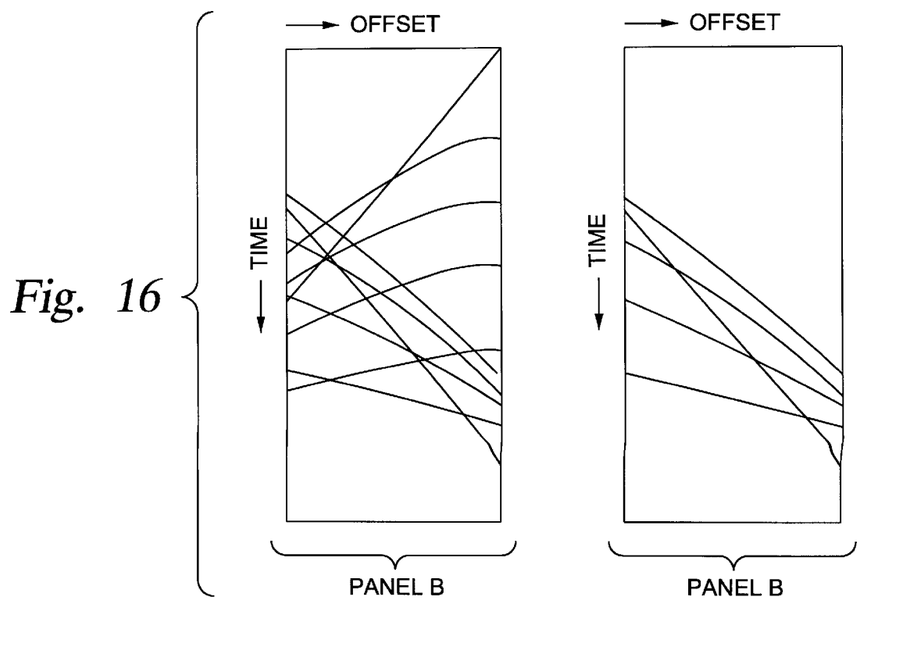
FIG. 16 is a graphical representation of filtering of the data of Panel B (of FIG. 14) to reject events (data) resulting from one of two seismic sources.

Similarly, FIGS. 16A and 16B illustrate further processing of the Panel A data. By known filtering methods, data traces resulting from data generated by the front source (source to the right, e.g. source 102, FIG. 9) is filtered out, producing a new Panel A of data as in FIG. 16B which does not include data related to the seismic survey events resulting from the firing of the front source. Source's geometry is applied to the data by known methods in which spatial coordinates such as offset and azimuth based on a source's (or detector's) x, y coordinates are applied.

Figure 17:
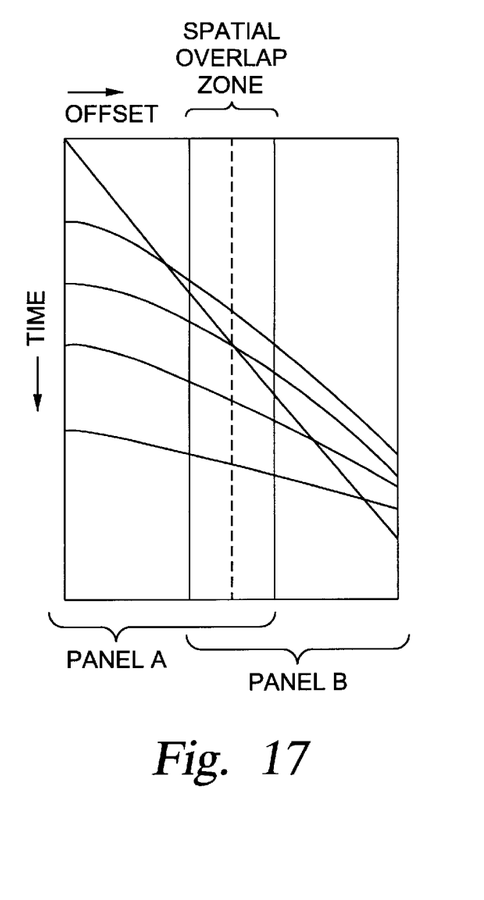
FIG. 17 is a graphical representation of the data resulting from the filtering of Panels A and B.

As shown in FIG. 17, the new Panel A data set and the new Panel B data set are merged with overlapping data superimposed to produce a merged data set which contains the data traces for seismic events related to the firing of the back (left) source only.

Figure 18:
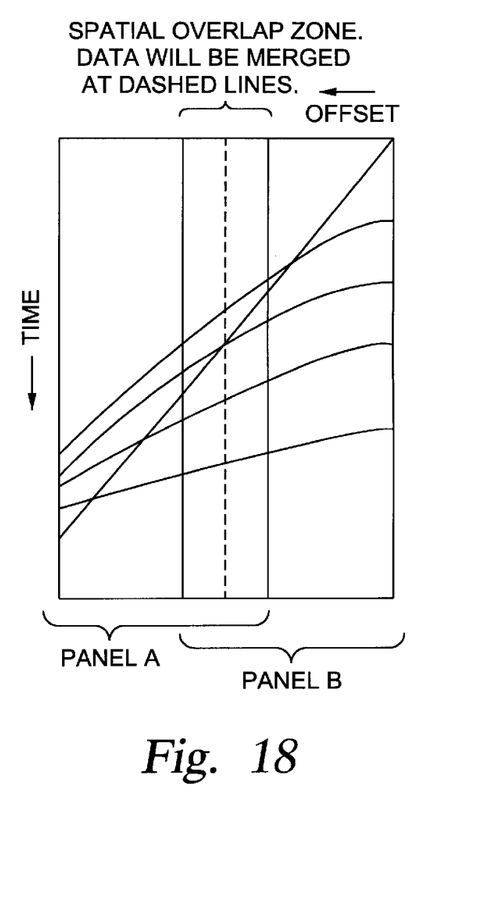
FIG. 18 is a graphical representation of the data resulting from the filtering of Panels A and B with left source data rejected.

By following a similar procedure as described above and applying the geometry (location coordinates) for the right (front) source, a new merged data set for data related to the right (front) source is produced, FIG. 18. The data set of FIG. 18 does not contain data representing seismic events related to the firing of the front (left) source. Thus a complete set of useful seismic data is produced which includes data related to the firing of both seismic sources.

Figure 19:
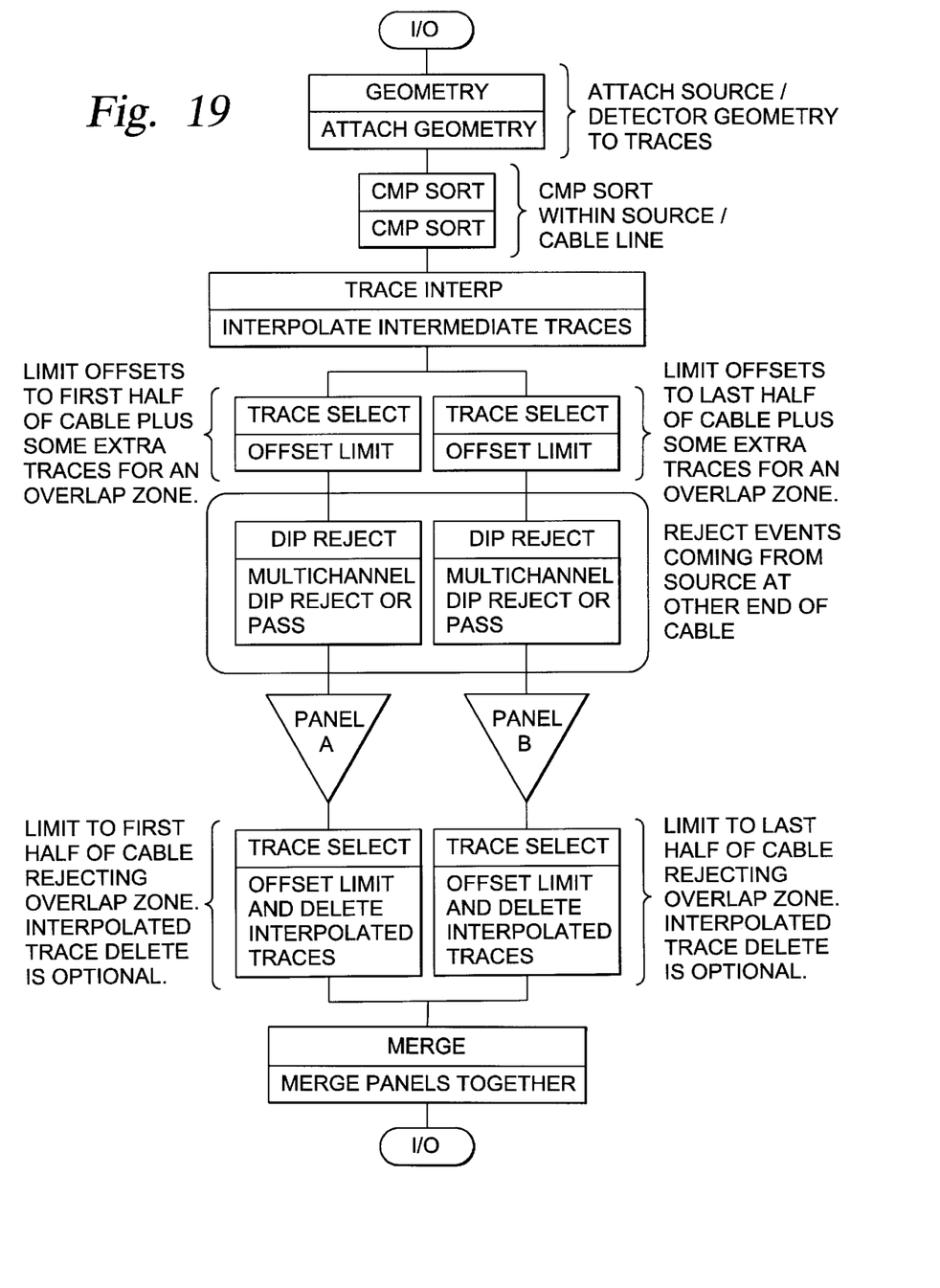
FIG. 19 is a schematic diagram of a method according to the present invention.

FIG. 19 is a schematic representation of the method discussed above. "I/O" is input, in this case the conglomeration and collection of the seismic data (e.g. as represented in FIG. 13) related to the firing of the back and front seismic sources (left, right; as the sources 108, 102, FIG. 9). As is known in the art such data is stored on known magnetic or optical media.

In the "Geometry" step, geometry related quantities such as offset, azimuth, and/or location coordinates indicating the precise location of each source and each detector are applied (using known prior art methods) to each data trace. With appropriate programs and computers, every data trace (from each of multiple sources) may, at this point, have the appropriate source's and detector's geometry applied to it.

In the "CMP Sort" step, individual data traces are sorted into those that share common midpoints to make each trace distinct and can be discriminated e.g. so that move out is hyperbolic and distance from other source data.

The "Trace Interp" interpolation step is optional. In this step, unknown data points between known data points are interpolated using known methods of trace interpolation (including but not limited to f–k trace interpolation). Such interpolation, among other things, reduces spatial aliasing and thereby facilitates the filtering step and the discrimination of data.

The "Trace Select" and "Dip Reject" steps begin with the selection of original data sets (e.g. Panels A and B as in FIG. 14) with some overlap and end with processing of these sets to produce the processed data for each data set that is merged ("Merge") to produce the final data set of data related to the firing of one of the sources.

Following the "Trace Interp" step, the Panel A data set is produced by applying to the data the geometry for the back, left source only and by taking only that part of the data having a particular offset distance range from the back, left source. The Panel B data set is similarly defined, using an offset distance range having some overlap with the offset distance range used to define the Panel A data set.

In the "Dip reject" step, any data attributable to the firing of the other source (the right, front source) is rejected, filtered out, using known filtering methods. The new Panel A (e.g. as in FIG. 15B) and Panel B (e.g. as in FIG. 16B) data sets are then processed so that data from the overlap zone is present only once and, optionally, so that interpolated data is deleted.

The last "I/O" step at the bottom of FIG. 19 signifies that the method may be done again to produce a merged data set for seismic events related to firing of the other source (the front, right source 102).

This invention has been described with a certain degree of specificity by way of example but not by way of limitation. Those skilled in the art will devise obvious variations to the examples given herein but which will fall within the scope of this invention which is limited only by the appended claims. In particular, this invention has been described with particular reference to marine seismic exploration at sea but the principles involved may be applied equally well to land or shallow water surveying after suitable obvious modifications to the claimed method and system to fit the particular environment.

It is seen, therefore, that the present invention in its various embodiments is well suited to carry out the objectives discussed above and attain the ends and objects set forth; and that, in one aspect, the present invention discloses a seismic survey method including firing at least once at least two seismic sources (or firing at least one such source and then moving it or them to another location for subsequent multiple firings) which are spaced-apart and including at least a first source and a second source, producing with each seismic source an acoustic wavefield directed to at least one earth layer apart from the seismic sources, detecting with at least one seismic detector a portion of each resulting acoustic wavefield from the at least one earth layer, converting the detected portions of each acoustic wavefield coming from the at least one earth layer to a first primary data set indicative of the earth layer, separating the first primary data set into at least two intermediate data sets, including at least a first intermediate data set and a second intermediate data set, each intermediate data set containing data related to the firing of each seismic source, filtering the first intermediate data set to eliminate all data except data related to firing of the first source, producing a refined first data set, filtering the second intermediate data set to eliminate all data except data related to firing of the first source, producing a refined second data set, and merging the refined first and second data sets, producing a first primary refined data set comprising useful seismic data related to firing of the first source. This method is referred to below as the "first base method."

The present invention also discloses the first base method with any or all of the following or with any possible combination thereof: the first base method wherein the first intermediate data set and the second intermediate data set combined include at least all data in the first primary data set; the first base method wherein the first intermediate data set includes an amount of common data which is also included in the second intermediate data set, wherein the amount of common data includes at least 33% of the data in the first primary data set, or wherein the amount of common data includes at least 2% of the data in the first primary data set; the first base set wherein the at least two seismic sources are two sources fired within at most 25 seconds of each other or within at most 15 seconds of each other, or they are fired substantially simultaneously; the first base method wherein the first primary data set is a set of a plurality of seismic data traces and the method further includes attaching source geometry information for each of the at least two seismic sources to each of the plurality of seismic data traces; the first base method including sorting the plurality of data traces according to a common feature (e.g common midpoint, common offset, common detector, and common source) shared by the traces; the first base method wherein the seismic data traces contain discontinuities and the method includes trace interpolating each of the plurality of seismic data traces producing interpolated data points for the discontinuities; the first base method including, after separating the first primary data set into at least two intermediate data sets, deleting the interpolated data points; the first base method wherein the filtering of each intermediate data set is done by a filtering method from the group consisting of multi-channel filtering, f–k filtering, and Radon transform filtering; the first base method wherein the at least two seismic sources are located on land or on or in water; the first base method wherein the at least two seismic sources are a single source fired at a first location and then moved and fired at least at a second location spaced apart from the first location; the first base method wherein the at least one seismic detector is a plurality of seismic detectors; the first base method wherein the at least two seismic sources are fired a plurality of times, the method including the at least one seismic detector detecting with respect to each firing, and processing resulting data as in the converting and subsequent steps of the base method; first base method wherein the amount of common data constitutes an overlap zone between the first and second intermediate data sets and the method including, after the filtering steps, eliminating the overlap zone; the first base method including producing a second primary data set of data indicative of the at least one earth layer, producing at least two intermediate data sets by separating the second primary data set into at least a third intermediate data set and a fourth intermediate data set, then producing a second primary refined data set comprising useful seismic data related to firing of the second source by filtering the third and fourth intermediate data sets to eliminate all data except data related to firing of the second source producing third and fourth refined data sets and by then merging the third and fourth refined data sets producing a second primary refined data set; and applying to the second primary data set and/or the intermediate data set any or all of the subsequent steps described herein with respect to them or any of them; and in one aspect, the first base method and/or the methods and steps related to the production of the second refined data set and/or the final refined data set wherein acoustic wavefields produced by the at least two seismic sources are comprised of plain signals.

In one aspect the present invention discloses a method of seismic exploration including advancing a swath of parallel elongated seismic cables along a line of survey, each said cable including a plurality of longitudinally spaced-apart detectors for detecting acoustic wavefields, launching a first acoustic wavefield from the leading end of said swath, detecting and storing said first acoustic wavefield, following reflection thereof from subsurface earth formations, as a first reflected seismic signal recording, launching a second acoustic wavefield from the trailing end of said swath, launching said second acoustic wavefield temporally substantially simultaneously with said launching of said first acoustic wavefield, detecting and storing said second acoustic wavefield, following reflection thereof from said subsurface earth formations, as a second reflected seismic signal recording, processing said first and said second reflected seismic signal recordings, and forming a substantially shadow-zone-free structural model of dipping subsurface earth formations by merging the processed first and second reflected seismic signal recordings; such a method including continuously advancing said swath along said line of survey at a preselected velocity, and repeatedly launching said first and said second acoustic wavefields at first timed intervals of predetermined length; and any such method wherein length of each said timed interval corresponds to a spatial advance of a multiple of the detector spacing at a preselected velocity of advance of said swath.

The present invention also discloses a system for acoustically surveying subsurface earth formations including a swath of a plurality of elongated parallel seismic cables, each said cable including a plurality of longitudinally spaced-apart detectors for receiving and converting acoustic wavefields to data sets of electrical signals, apparatus for effectively advancing said swath along a line of survey, at least a first discrete acoustic source located near the leading end of said swath, at least a second discrete acoustic source located near the trailing end of said swath, timer apparatus for causing said first and second acoustic sources to insonify said earth formations at substantially the same time, thereby to provide first and second reflected acoustic wavefields for reception by said detectors and for conversion of said first and second reflected acoustic wavefields to first and second data sets of electrical signals, and apparatus, operatively coupled to said detectors, for processing and merging said first and second data sets of electrical signals to provide a uniformly-insonified model of said earth formations; such a system including a first plurality of discrete acoustic sources located near the leading end of said swath, a second plurality of discrete acoustic sources located near the trailing end of said swath, and apparatus for causing selected sources taken from the first and second pluralities of discrete acoustic sources to insonify subsurface earth formations at timed intervals in a desired operational sequence.

The present invention also discloses a method of seismic exploration including advancing a swath of parallel elongated seismic cables along a line of survey, each said cable including a plurality of spaced-apart seismic transducers, simultaneously launching first and second acoustic wavefields from the leading and trailing ends respectively, of said swath, each said acoustic wavefield being uniquely encoded, detecting and recording the combined first and second encoded acoustic wavefields, following reflection or refraction thereof from subsurface earth formations, decoding the combined recorded reflected wavefields to separate the first and second reflected acoustic wavefields, separately processing each of the decoded first and second recorded reflected wavefields, and generating a substantially uniformly-insonified model of dipping subsurface earth formations by merging the first and second processed reflected wavefields.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A seismic survey method comprising firing at least once at least two seismic sources which are spaced-apart and including at least a first source and a second source, producing with each seismic source an acoustic wavefield directed to at least one earth layer apart from the seismic sources, detecting with at least one seismic detector a portion of each resulting acoustic wavefield from the at least one earth layer, converting the detected portions of each acoustic wavefield coming from the at least one earth layer to a first primary data set indicative of the earth layer, separating the first primary data set into at least two intermediate data sets, including at least a first intermediate data set and a second intermediate data set, each intermediate data set containing data related to the firing of each seismic source, filtering the first intermediate data set to eliminate all data except data related to firing of the first source, producing a refined first data set, filtering the second intermediate data set to eliminate all data except data related to firing of the first source, producing a refined second data set, and merging the refined first and second data sets, producing a first primary refined data set comprising useful seismic data related to firing of the first source.

2. The seismic survey method of claim 1 wherein the first intermediate data set and the second intermediate data set combined include at least all data in the first primary data set.

3. The seismic survey method of claim 1 wherein the first intermediate data set includes an amount of common data which is also included in the second intermediate data set.

4. The seismic survey method of claim 3 wherein the amount of common data includes at least 33% of the data in the first primary data set.

5. The seismic survey method of claim 3 wherein the amount of common data includes at least 2% of the data in the first primary data set.

6. The seismic survey method of claim 1 wherein the at least two seismic sources are two sources fired within 25 seconds of each other.

7. The seismic survey method of claim 1 wherein the at least two seismic sources are two sources fired within 15 seconds of each other.

8. The seismic survey method of claim 1 wherein the at least two seismic sources are two sources fired substantially simultaneously.

9. The seismic survey method of claim 1 wherein the first primary data set is a set of a plurality of seismic data traces and the method further comprising attaching source geometry information for each of the at least two seismic sources to each of the plurality of seismic data traces.

10. The seismic survey method of claim 9 further comprising sorting the plurality of data traces according to a common feature shared by the traces.

11. The seismic survey method of claim 10 wherein the common feature is from the group consisting of common midpoint, common offset, common detector, and common source.

12. The method of claim 1 wherein the seismic data traces contain discontinuities and the method further comprising trade interpolating each of the plurality of seismic data traces producing interpolated data points for the discontinuities.

13. The method of claim 12 further comprising after separating the first primary data set into at least two intermediate data sets, deleting the interpolated data points.

14. The method of claim 1 wherein the filtering of each intermediate data set is done by a filtering method from the group consisting of multi-channel filtering, f–k filtering, and Radon transform filtering.

15. The method of claim 1 wherein the at least two seismic sources are located on land.

16. The method of claim 1 wherein the at least two seismic sources are located on or in water.

17. The method of claim 1 wherein the at least two seismic sources are a single source fired at a first location and then moved and fired at a second location spaced apart from the first location.

18. The method of claim 1 wherein the at least one seismic detector is a plurality of seismic detectors.

19. The method of claim 1 wherein the at least two seismic sources are fired a plurality of times, the method including the at least one seismic detector detecting with respect to each firing, and processing resulting data as in the converting and subsequent steps of claim 1.

20. The method of claim 3 wherein the amount of common data constitutes an overlap zone between the first and second intermediate data sets and the method further comprising, after the filtering steps, eliminating the overlap zone.

21. The method of claim 1 further comprising producing a second primary data set of data indicative of the at least one earth layer, producing at least two intermediate data sets by separating the second primary data set into at least a third intermediate data set and a fourth intermediate data set, then producing a second primary refined data set comprising useful seismic data related to firing of the second source by filtering the third and fourth intermediate data sets to eliminate all data except data related to firing of the second source producing third and fourth refined data sets and by then merging the third and fourth refined data sets producing a second primary refined data set.

22. The method of claim 21 further comprising merging the first and second primary data sets producing a final data set comprising useful seismic data related to the firing of both the first and second sources.

23. The method of claim 21 wherein the third intermediate data set includes an amount of common data which is also included in the fourth intermediate data set.

24. The method of claim 21 wherein the at least two seismic sources are two sources fired within 15 seconds of each other.

25. The method of claim 21 wherein the at least two seismic sources are two sources fired substantially simultaneously.

26. The method of claim 21 the second primary data set is a set of a plurality of seismic data traces and the method further comprising attaching source geometry information for each of the at least two seismic sources to each of the plurality of seismic data traces.

27. The method of claim 26 further comprising sorting the plurality of data traces according to a common feature shared by the traces.

28. The method of claim 27 wherein the common feature is from the group consisting of common midpoint, common offset, common detector, and common source.

29. The method of claim 26 wherein the seismic data traces contain discontinuities and the method further comprising trace interpolating each of the plurality of seismic data traces producing interpolated data points for the discontinuities.

30. The method of claim 21 further comprising after separating the second primary data set into at least two intermediate data sets, deleting the interpolated data points.

31. The method of claim 21 wherein the filtering of each intermediate data set is done by a filtering method from the group consisting of multi-channel filtering, f–k filtering, and Radon transform filtering.

32. The method of claim 21 wherein the at least two seismic sources are located on land.

33. The method of claim 21 wherein the at least two seismic sources are located on or in water.

34. The method of claim 23 wherein the amount of common data constitutes an overlap zone between the third and fourth intermediate data sets and the method further comprising, after the filtering steps, eliminating the overlap zone.

35. The method of claim 1 wherein acoustic wavefields produced by the at least two seismic sources are comprised of plain signals.

36. The method of claim 21 wherein acoustic wavefields produced by the at least two seismic sources are comprised of plain signals.

37. A method of seismic exploration, comprising advancing a swath of parallel elongated seismic cables along a line of survey, each said cable including a plurality of longitudinally spaced-apart detectors for detecting acoustic wavefields, launching a first acoustic wavefield from the leading end of said swath, detecting and storing said first acoustic wavefield, following reflection thereof from subsurface earth formations, as a first reflected seismic signal recording, launching a second acoustic wavefield from the trailing end of said swath, launching said second acoustic wavefield temporally substantially simultaneously with said launching of said first acoustic wavefield, detecting and storing said second acoustic wavefield, following reflection thereof from said subsurface earth formations, as a second reflected seismic signal recording, processing said first and said second reflected seismic signal recordings, and forming a substantially shadow-zone-free structural model of dipping subsurface earth formations by merging the processed first and second reflected seismic signal recordings.

38. The method as defined by claim 37, comprising continuously advancing said swath along said line of survey at a preselected velocity, and repeatedly launching said first and said second acoustic wavefields at first timed intervals of predetermined length.

39. The method as defined by claim 38, wherein length of each said timed interval corresponds to a spatial advance of a multiple of the detector spacing at a preselected velocity of advance of said swath.

40. A system for acoustically surveying subsurface earth formations, comprising a swath of a plurality of elongated parallel seismic cables, each said cable including a plurality of longitudinally spaced-apart detectors for receiving and converting acoustic wavefields to data sets of electrical signals, means for effectively advancing said swath along a line of survey, at least a first discrete acoustic source located near the leading end of said swath, at least a second discrete acoustic source located near the trailing end of said swath, timer means for causing said first and second acoustic sources to insonify said earth formations at substantially the same time, thereby to provide first and second reflected acoustic wavefields for reception by said detectors and for conversion of said first and second reflected acoustic wavefields to first and second data sets of electrical signals, and means, operatively coupled to said detectors, for processing and merging said first and second data sets of electrical signals to provide a uniformly-insonified model of said earth formations.

41. The system as defined by claim 40 comprising a first plurality of discrete acoustic sources located near the leading end of said swath, a second plurality of discrete acoustic sources located near the trailing end of said swath, and means for causing selected sources taken from the first and second pluralities of discrete acoustic sources to insonify subsurface earth formations at timed intervals in a desired operational sequence.

42. A method of seismic exploration comprising advancing a swath of parallel elongated seismic cables along a line of survey, each said cable including a plurality of spaced-apart seismic transducers, simultaneously launching first and second acoustic wavefields from the leading and trailing ends respectively, of said swath, each said acoustic wavefield being uniquely encoded, detecting and recording the combined first and second encoded acoustic wavefields, following reflection thereof from subsurface earth formations, decoding the combined recorded reflected wavefields to separate the first and second reflected acoustic wavefields, separately processing each of the decoded first and second recorded reflected wavefields, and generating a substantially uniformly-insonified model of dipping subsurface earth formations by merging the first and second processed reflected wavefields.

\* \* \* \* \*